(No Model.)
E. H. & A. H. COWLES.
ELECTRIC PROCESS OF SMELTING ORE FOR THE PRODUCTION OF
ALLOYS, BRONZES, AND METALLIC COMPOUNDS.
No. 324,658. Patented Aug. 18, 1885.
FIG. I.
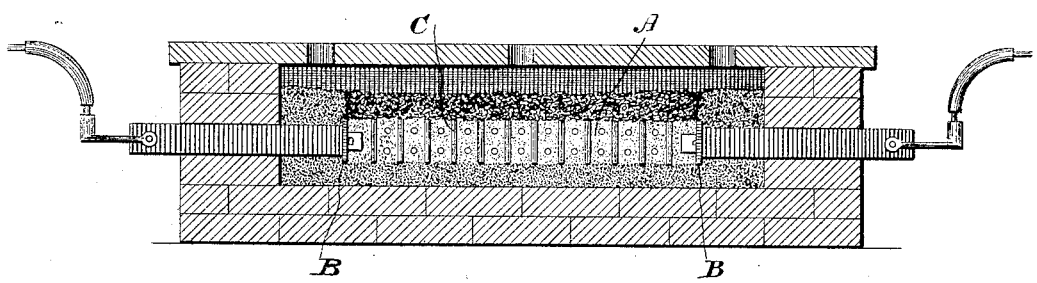
FIG. II.
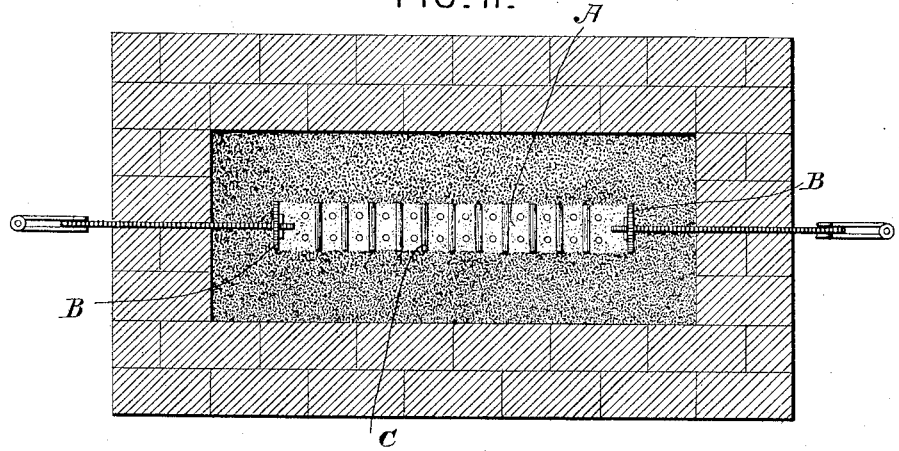
Attest:
Geo. T. Smallwood,
C. T. Bell
Inventors
Eugene H. Cowles
and Alfred H. Cowles
By Paine & Last,
Attys.

UNITED STATES PATENT OFFICE.

EUGENE H. COWLES AND ALFRED H. COWLES, OF CLEVELAND, OHIO.

ELECTRIC PROCESS OF SMELTING ORE FOR THE PRODUCTION OF ALLOYS, BRONZES, AND METALLIC COMPOUNDS.

SPECIFICATION forming part of Letters Patent No. 324,658, dated August 18, 1885.

Application filed April 7, 1885. (No model.)

*To all whom it may concern:*

Be it known that we, EUGENE H. COWLES and ALFRED H. COWLES, citizens of the United States, residing at Cleveland, in the county of Cuyahoga and State of Ohio, have invented certain new and useful Improvements in Electric Process of Smelting Ore for the Production of Alloys, Bronzes, and Metallic Compounds; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the present invention is to improve the art of manufacturing alloys and bronzes, and especially the combination of the rarer metals and metalloids—for example, aluminium, silicium, boron, and others—with copper or such other cheap metal as it may be proposed to use as the base of the alloy.

In a prior application we have described an improved process of smelting ores and reducing the salts of refractory metals by means of electricity, which consists, briefly, in the use of a body of broken or pulverized carbon made incandescent by the passage of an electric current through the same; and in carrying out our present invention we preferably use said process as being best adapted for the purpose.

This invention consists in mixing with or embedding in the body of broken carbon pieces of the metal which is to constitute the base of the alloy, whereby it is melted by the incandescent carbon, and takes up the other metal, whatever it may be, that is being smelted or reduced. This produces an alloy rich in the rare metal, sometimes to the point of saturation, and the alloy is afterward brought down to the proper percentage by the remelting of the alloy and the addition of the necessary amount of base metal by any ordinary process. In this manner aluminium bronze, silicium bronze, boron bronze—a new product, which is made the subject-matter of a separate application—and many other copper alloys can be cheaply manufactured, as well as similar alloys with iron, zinc, lead, tin, and other metals, as desired.

In the accompanying drawings, which illustrate a method of practicing this invention, Figure I is a longitudinal section through a furnace. Fig. II is a horizontal section of the same.

Reference is made to another application, filed February 24, 1885, for a full description of the furnace and method of charging and operating the same.

For the purposes of illustration, we will assume that aluminium bronze is to be made. The ore of aluminium, corundum, cryolite, clay, or whatever it may be that is to be used, is pulverized and mixed with the broken carbon along with a pulverized ore of copper—for instance, an oxide—and a charge, A, of the mixed aluminium and copper ores and carbon is packed in between the carbon plates B B; or metallic copper may be used instead of a copper ore, in which case the core has metallic copper distributed through it in such a manner that it cannot short-circuit the current, and we accomplish this in the following manner: Wires or rods of copper, C, are inserted into the core at right angles to the axis of the core. These are distributed at uniform distances apart throughout the core, and they may run vertically or horizontally or at an inclination, provided they lie in planes transverse to the axis of the core. They may of course be laid in as the core is built up, instead of being inserted afterward. When the current is passed through the core, the heat generated thereby melts the metallic copper or reduces the copper or other ore to metal, and the metallic copper takes up the aluminium as it is reduced from the corundum or other aluminous ore. The product obtained at the close of the operation is an aluminium-copper alloy or aluminium bronze, in the same way that the simple reduced metal is found, as described in the prior application above referred to.

When using metallic copper, instead of distributing it through the core in the form of wires or rods, as above described, it may be done by mixing granulated copper with the mixed alumina and carbon in the same manner that the copper ore is mixed, and if the metallic copper is uniformly distributed the result will be the same; but it is not so easy in that way to secure a perfectly uniform distribution, and short-circuiting will take place through parts of the core if a number of the grains of metallic copper happen to be in contact or nearer each other than in other parts of the core.

When an alloy is to be made with some other metal than copper as the base, rods of the metal or pulverized ore of the same are inserted in the core or mixed therewith, as the case may be, in the same manner as described.

While the above description relates to the process as used and practiced by us in our incandescent furnace, it is not our intention to limit this application to the aforesaid incandescent furnace, for the same process may be practiced in other electric furnaces—as, for example, in the Siemens electric-arc furnace. For example, in that case we would either mix the ores or metals to be reduced together or alloyed in the arc furnace or crucible, or we would use an electrode of copper, tin, nickel, iron, or other metal, as the case might be, depending on the heat and force of the current at the arc to smelt and carry over to the mixture of ore, carbon, or metals the metal of the electrode, and thus incorporating the same together into an alloy, carbide, silicide, or boride, as desired, the operation being performed entirely by electrical energy and the reducing effect of carbon; and we further assert that results in alloying and compounding may be obtained that cannot be otherwise performed, on account of the intensity of the temperature attainable by this means, and above all by the intermixing, incorporating, and merging power of the current. As instance of this, we cite the absorption of boron by copper, forming a boride of copper when compounded in this furnace, a result not before obtained, as well as the saturation of copper and iron with aluminium, or silicium and manganese with aluminium, to a higher degree than heretofore known.

We are aware that alloys have been produced by electrolysis, the current being made to pass through plates of platinum and carbon placed in contact with a base metal and with the compound to be reduced, and therefore we do not claim the same broadly.

Having thus fully described our invention, what we claim as new, and desire to secure by Letters Patent, is—

1. The process of producing alloys, which consists in passing an electric current through a mixture of broken resistance material—ore to be reduced and pieces of the base metal of the alloy—so that said mixture is rendered incandescent and the alloy formed, substantially as hereinbefore described and set forth.

2. The process of producing alloys, which consists in passing an electric current through a mixture of broken resistance material and ore to be reduced into which wires or rods of the base metal of the alloy have been inserted transversely to the path of the current, substantially as and for the purpose set forth.

3. The process of producing alloys hereinbefore described, which consists in mixing together ore of one of the metals of the alloy, broken or pulverized carbon, inserting wires or rods of the other metal of the alloy into the said mixture, and then passing an electric current through the mixture in a transverse direction to the wires or rods, so that the said mixture is rendered incandescent and an alloy formed, substantially as set forth.

In testimony whereof we affix our signatures in presence of two witnesses.

EUGENE H. COWLES.
ALFRED H. COWLES.

Witnesses for A. H. Cowles:
MORTON W. COPE,
CHAS. W. CHASE.

Witnesses for E. H. Cowles:
STORY B. LADD,
C. T. BELT.